April 11, 1950        E. L. DEETER        2,503,248

ELECTRONIC CONTROL SYSTEM

Filed Dec. 18, 1945        3 Sheets-Sheet 1

Inventor
*E. L. Deeter*
M. O. Hayes
By
Attorney

April 11, 1950 E. L. DEETER 2,503,248
ELECTRONIC CONTROL SYSTEM
Filed Dec. 18, 1945 3 Sheets-Sheet 2

Inventor
E. L. Deeter
By M. O. Hayes
Attorney

April 11, 1950     E. L. DEETER     2,503,248
ELECTRONIC CONTROL SYSTEM
Filed Dec. 18, 1945     3 Sheets-Sheet 3

Inventor
*E. L. Deeter*
By
M. O. Hayes
Attorney

UNITED STATES PATENT OFFICE 2,503,248

ELECTRONIC CONTROL SYSTEM

Everett L. Deeter, Washington, D. C.

Application December 18, 1945, Serial No. 635,821

5 Claims. (Cl. 346—33)

(Granted under the act of March 3, 1883, as amended April 30, 1928; 370 O. G. 757)

The present invention relates generally to control devices. More particularly, the present invention relates to an electronic control device adapted to respond to minute changes in a condition to be controlled.

It is well known that if the control grid of an ordinary radio receiving tube is left disconnected, that is "floating," and proper operating potentials are applied to the plate and cathode thereof, the control grid will assume a negative charge of approximately one volt by reason of electron bombardment within the tube. If a small square of metal is attached to the grid cap of the tube and is exposed to external electro-static fields, the control grid of the tube will assume a negative charge of greater amplitude due to the lack of a grid leak path. The amplitude of this negative charge is dependent upon the strength of the surrounding field, the area of the metal square attached to the grid cap and the grid to cathode impedance of the tube used. As the negative charge on the control grid increases, the plate current flowing in the tube decreases whereby the value of plate current is controlled by variations in the strength of the ambient electro-static field.

The floating grid principle above described is utilized in the device of the present invention to provide stepless control over changeable conditions. When an alternating potential is applied to the control grid of a tube through a small condenser, normal operating potentials being applied to the remaining elements thereof, electrons from the control grid collect on that condenser plate which is located nearest the grid during the positive half cycle. During the next half cycle when the outer condenser plate is negative, the electrons accumulated during the previous half cycle are trapped in the circuit between the inner condenser plate and grid. This accumulation of electrons continues on the following cycles until the charge on the grid becomes sufficiently negative to effectively "block" the flow of plate current within the tube. The extent of the blocking of plate current accomplished in this manner is dependent upon the capacity of the condenser, the value of A.-C. potential applied to the grid and the leakage resistance from grid to cathode or ground over the grid supports and surface of the tube. Thus, a change in the value of applied A.-C. potential or in the capacitance of the condenser changes the grid bias of the tube and thereby controls the value of current flow through the tube.

In accordance with the preferred embodiment of the present invention, a third plate is introduced into the condenser and is supported on the indicating arm of a meter whereby the third plate is adapted to pass between the inner and outer plates of the condenser to reduce the capacity thereof as the meter is actuated. The movable plate is tied to the cathode of the tube through ground whereby the blocking bias of the tube associated with the condenser is reduced as the movable plate passes between the inner and outer condenser plates thereby controlling the value of plate current in the tube. This change in plate current is amplified and utilized to operate a suitable gas tube which, when operated, is adapted to energize an electrical relay. The aforesaid meter may be connected to any suitable device responsive to a changeable condition which it is desired to control, such a device, for example, being a thermocouple when it is desired to utilize the present invention for temperature control. As the electrical relay is energized, a circuit is completed whereby an indication of a change in the condition to be controlled may be made manifest.

In accordance with another embodiment of the present invention, a system for driving a recorder in response to relatively weak signals is contemplated which incorporates the aforedescribed grid blocking principle. A pair of vacuum tubes are arranged in a bridge circuit with the blocking potentials applied to the grids thereof in a push-pull connection. The change in plate current produced in each tube by changes in the blocking potentials is utilized to control the operation of the recorder driving motor.

It is a broad object of the present invention to provide new and improved means for controlling the electron flow in an electron discharge device.

Another object is to provide new and improved means for producing and controlling an electron accumulation on the control element of an electron discharge device.

Another object of the present invention is to provide a new and improved stepless control device which is continuously responsive to changes in a condition to be controlled.

Another object is the provision of a new and improved electronic control device adapted to operate a relatively heavy mechanism in response to small changes in a condition to be controlled.

A further object is the provision of a control device of the electronic relay type in which an instantaneous operating point thereof may be determined.

A still further object is to provide a new and improved electronic recorder driver adapted to effect accurate control of the recorder.

Additional objects and advantages not specifically set forth hereinabove will be apparent from the following description, taken in connection with the accompanying drawings, of which:

Figure 7:
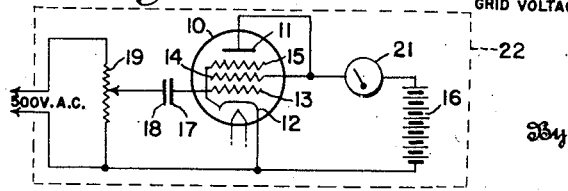
Fig. 7 shows in diagrammatic form the fundamental grid blocking circuit of the present invention.

Referring now to Fig. 7 of the drawings the numeral 10 designates a five element thermionic tube comprising a plate 11 and heater type cathode 12. A screen grid 14 and suppressor grid 15 are tied to the plate and cathode respectively in the usual manner. Operating potential is supplied to the plate 11 and cathode 12 from a battery 16. The control grid 13 of tube 10 is disconnected or left floating with one plate 17 of an air condenser being connected thereto. The second plate 18 of the condenser is arranged parallel to plate 17 thereof and supported by any suitable means which assures a high resistance path between grid 13 and cathode 12. The outer condenser plate 18 is connected to a suitable source of A.-C. supply voltage through a potentiometer 19 which is also connected to cathode 12.

As the value of A.-C. potential applied between the outer condenser plate and cathode is varied, the charge in the condenser comprising the plates 17 and 18 and the bias of grid 13 will vary in accordance therewith in a manner heretofore described. As the grid bias varies, the amount of current flow in the plate circuit of tube 10 will vary in accordance therewith and cause a meter 21, connected in the plate circuit, to deflect to give an indication of the magnitude of change in the applied A.-C. potential. It will be appreciated that the capacity of the condenser is very small in order that small changes in the applied A.-C. potential may be detected and made manifest by the action of meter 21. However, the capacity of the condenser may be changed by varying the distance between the plates 17 and 18. In order to prevent ambient electro-static fields from reacting on the plates to vary the condenser capacity, tube 10 and the condenser are enclosed in a suitable cabinet 22.

Figure 6:
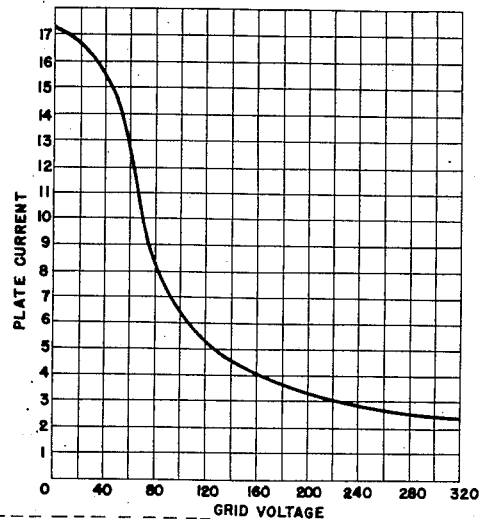
Fig. 6 illustrates in graphic form the variation in plate current due to changes in the blocking potential applied to the device of Fig. 3.

Referring to Fig. 6, it will be seen that with applied A.-C. potentials between 10 and approximately 80 volts, the plate current flowing through tube 10 decreases very rapidly by reason of the increasing blocking potential appearing on the grid of the tube, the potentials on the plate and cathode thereof being held constant. As the applied A.-C. potential is increased over 80 volts less change is produced in the plate current, the curve becoming a nearly straight line. From an analysis of the curve of Fig. 6, it readily will be appreciated that the fundamental circuit of Fig. 7 may be utilized as a control device either by shielding the circuit and causing it to be responsive to variations in the applied potential or by holding the applied potential constant and exposing the condenser plates to the surrounding atmosphere to be responsive to changes therein such, for example, as changes in humidity which affects the charge on the condenser. In the latter application, the condenser plates are separated further in order to decrease the capacity of the condenser and increase the sensitivity of the device.

Figure 3:
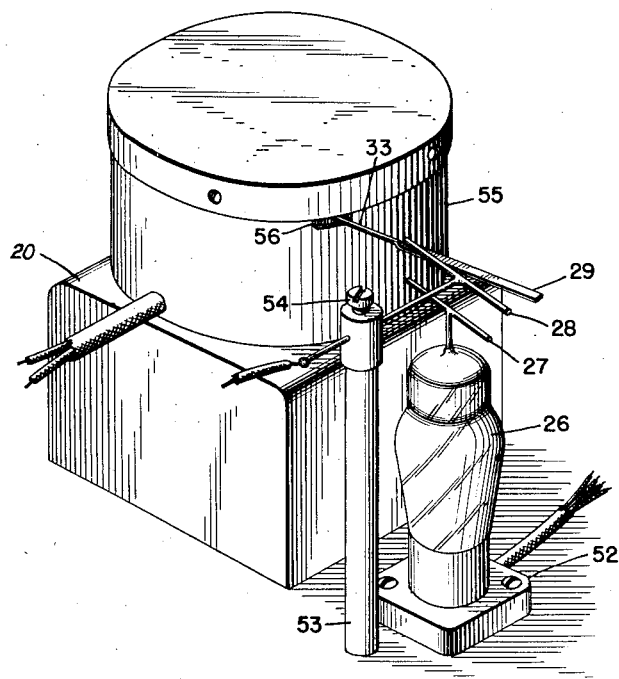
Fig. 3 is a view in perspective of the control device of the present invention according to the preferred embodiment thereof.
Figure 4:
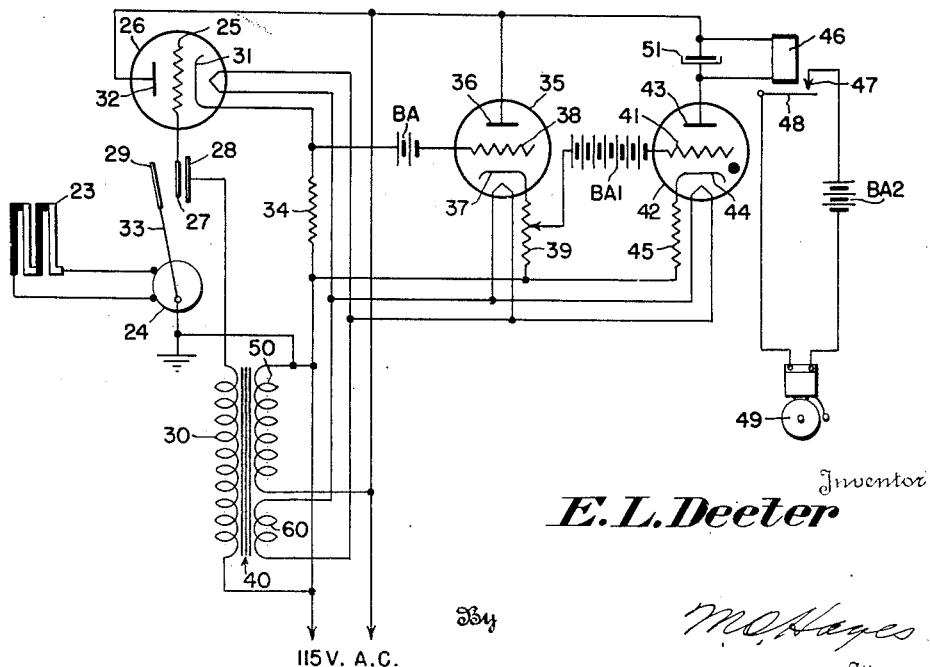
Fig. 4 illustrates in diagrammatic form the complete electrical system of the device of Fig. 3.

An application of the grid blocking potential principle set forth hereinabove is illustrated in Figs. 3 and 4. The numeral 23, Fig. 4, designates a thermocouple which is adapted to control the operation of a galvanometer 24 variably in accordance with temperature changes detected by the thermocouple. Blocking potential is applied to the control grid 25 of tube 26 by a condenser system comprising plates 27, 28 and 29. Plate 27 is secured to the control grid 25 of tube 26 in any suitable manner and plate 28 is arranged parallel to plate 27 and is supported in a manner adapted to provide a high resistance path from grid 25 to the cathode 31 of tube 26. An A.-C. potential, provided by secondary winding 30 of a transformer 40 having a primary winding 50 connected to a suitable A.-C. source, is applied between plate 28 and cathode of tube 26 whereby the condenser formed by plates 27 and 28 becomes charged to a value dependent upon the separation of the plates and the magnitude of the applied voltage. Concurrently with the charge being built up on the condenser, the grid of tube 26 becomes negatively charged to a value dependent upon the charge on the condenser. Inasmuch as potential is applied to the anode 32 of tube 26 from the A.-C. source, a small amount of current will flow therethrough dependent upon the potential on the grid.

The condenser plate 29 is carried by the indicating arm 33 of the galvanometer 24 and is tied to ground through the arm, the normal unoperated position of the arm being such as to position plate 29 away from plates 27 and 28 in order that the capacity therebetween will not be affected by plate 29 until the plate 29 is moved between plates 27 and 28, thereby providing critical amplitude control over the apparatus to be operated in response to predetermined changes in the condition to be controlled. As the arm is deflected in response to a temperature change detected by the thermocouple, plate 29 is adapted to pass between plates 27 and 28 thereby reducing the capacity therebetween and the negative charge on grid 25 to increase the flow of current through the tube.

A load resistor 34 is connected in the cathode circuit of tube 26 whereby the tube is adapted to be operated as a cathode follower and insure more stable operation of the control device by reason of the high grid to cathode resistance present in cathode followers. A tube 35 is employed in the control device and comprises an anode 36, cathode 37 and control grid 38, potential being applied to the plate and cathode thereof from the A.-C. source. A fixed bias for the control grid 38 of the amplifier is provided by battery BA while an operating voltage is applied thereto from the cathode resistor 34 when the current flow through tube 26 is increased. Tube 35 is also cathode loaded and is provided with a variable resistor 39 in the cathode circuit thereof, the potential drop produced across this resistor by an increase in plate current of tube 26 being applied to the control grid 41 of a gas type tube 42 by way of bias battery BA1 to initiate conduction thereof. Such an arrangement yields a trigger action and allows critical amplitude operation in controlling circuits. Tube 42 further comprises an anode 43 and cathode 44, normal operating potential for these tube elements being supplied from the A.-C. source. A resistor 45 is included in the cathode circuit of tube 42 to further insure stable operation of the control device.

Arranged in the anode circuit of tube 42 is an electrical relay 46 comprising stationary contact 47 and armature contact 48 and which, when operated, is adapted to complete a circuit from battery BA2 to a bell 49 thereby to give an audible indication of the temperature change detected by the thermocouple 23. A condenser 51 is shunted across relay 46 in order to prevent the relay from chattering, the condenser being shielded to prevent its electro-static field from affecting the grid condenser. The heaters of tubes 26, 35 and 42 may be supplied from secondary winding 60 of transformer 40 by any suitable circuit arrangement.

In operation of the control device, the A.-C. potential applied to the condenser plate 28 preferably is increased to a value which will reduce the normal current flow through the tube to near cut-off, and the tube is operated on the lower straight portion of the curve of Fig. 6 whereby small changes in the applied voltage due to imperfect regulation, tube leakage and capacitance variations are prevented from affecting the operation of the control device.

The change in plate current in tube 26 which is dependent upon a change in the capacity of the condenser formed by plates 27 and 28 may be increased by orientating the meter indicating arm in such a manner as to cause plate 29 carried thereby to pass closer to plate 27. Overall operating conditions may be greatly improved by increasing the length of the indicating arm 33 in order that the arc through which the arm swings will be increased whereby the meter movement may be placed at a greater distance from tube 26 and stray capacitance therebetween reduced to a minimum.

Fig. 3 shows the general arrangement of the control device heretofore described. Tube 26 and its associated socket 52 are mounted on any suitable chassis. The grid condenser plates preferably are formed of tinned copper wire, plate 27 being secured, as by soldering, to the grid connection of the tube. Plate 28 extends through and is supported by a suitable insulating post 53, the position of plate 28 relative to plate 27 being maintained by a screw 54 mounted in the top of post 53 and the conductor leading to plate 28 preferably being shielded. Galvanometer 24 is arranged in a suitable cabinet 55 provided with a slot 56 through which the indicating arm of the meter extends whereby the meter elements are prevented from affecting the capacity of the grid condenser. Plate 29 is composed of any suitable light weight material such, for example, as aluminum tubing and is sleeved about the outer end of the indicating arm. The position of plate 29 relative to plates 27 and 28 is maintained by a base 20 upon which cabinet 55 rests. If it is desired to increase the effect of plate 29 upon the grid condenser, the outer end thereof may be flattened as illustrated in Fig. 3.

Figure 1:
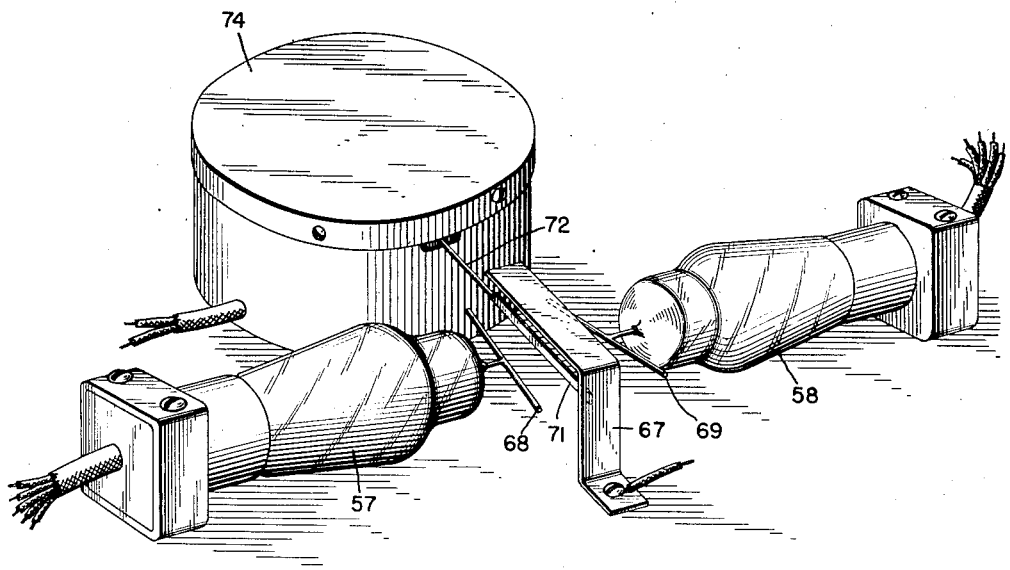
Fig. 1 is a view in perspective of the recorder driver.
Figure 2:
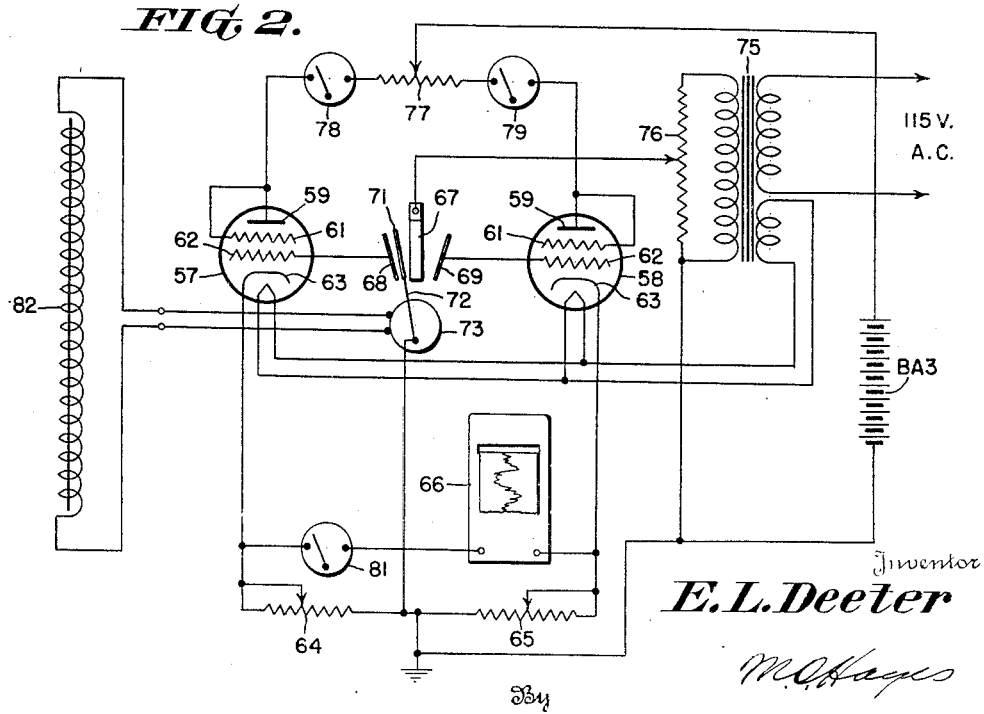
Fig. 2 illustrates in diagrammatic form the complete electrical system of the recorder driver.

Figs. 1 and 2 illustrate an adaptation of the grid blocking principle to a recorder driver system. Two similar tubes 57 and 58 are arranged in a balanced bridge circuit, each of the tubes forming one of the arms of the bridge circuit and comprising an anode 59, a screen grid 61 tied to the anode, a control grid 62 and cathode 63. The remaining two arms of the bridge circuit are formed respectively by variable resistors 64 and 65 connected in the cathode circuits of tubes 57 and 58 respectively. The detector arm of the bridge circuit is formed by a suitable polarity responsive pen recorder 66.

Blocking potential is applied to the tubes in a manner similar to that heretofore described. Each of the tubes is provided with a grid condenser comprising a common stationary plate 67 connected to a suitable A.-C. source through a transformer 75 and a variable resistor 76, plate 68 being suitably secured to the control grid of tube 57 to form the condenser therefor and plate 69 being suitably secured to the control grid of tube 58 to form the condenser therefor. A movable plate 71 is employed and is carried by a grounded indicating arm 72 of a galvanometer 73 arranged in a suitable cabinet 74, Fig. 1, in order to prevent the moving elements of the meter from affecting the value of the blocking potential.

Operating potential is applied to the anodes of tubes 57 and 58 from a battery BA3, the cathodes of the tubes being tied to the negative side of battery BA3. A variable resistor 77 is arranged intermediate battery BA3 and the anodes of the tubes in order that the potential applied thereto may be adjusted to cause equal values of current to flow through each tube when the movable plate 71 is in a null position intermediate plates 68 and 69. Suitable ammeters 78 and 79 are interposed respectively intermediate the resistor 77 and the anodes of tubes 57 and 58 for convenience in equalizing the current flow in each of the tubes. For convenience in adjusting the pen of recorder 66 to the center of the record paper, an ammeter 81 is arranged in the detector arm of the aforesaid bridge to indicate a zero current therein.

Figure 5:
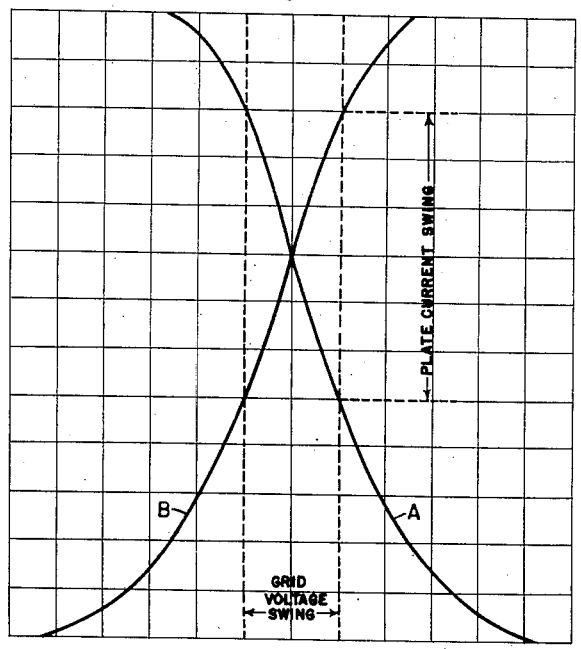
Fig. 5 illustrates in graphic form the variation in plate current of each one of the tubes in the recorder driver caused by a change in the grid bias voltage of each one of the tubes.

Referring now to Fig. 5 of the accompanying drawings, there is shown thereon the operating characteristics of tubes 57 and 58, curve A representing the characteristics of tube 57 and curve B the characteristics of tube 58. With a predetermined A.-C. potential applied to the stationary plate 67 and a predetermined separation between each of plates 68 and 69 and the common plate 67, the swing of the grid potential applied to each one of the tubes in accordance with a full deflection of the movable plate 71 in either direction from the null position thereof will be limited in such a manner to cause the plate current change in either of the tubes to be linear, as illustrated in Fig. 5.

For the purpose of description, let it be assumed that the system of Fig. 2 is to be employed to record the output of an induction pick-up coil 82 in response to a changing ambient magnetic field in which case the galvanometer 73 is connected to the output terminals of the coil. Let it further be assumed that as the intensity of the ambient magnetic field increases over the normal value thereof, the indicating arm of the galvanometer and condenser plate 71 carried thereby is caused to move in the direction of condenser plate 68. When this occurs, the capacitance between plates 67 and 68 and the negative charge on the control grid 62 of tube 57 is reduced, thus increasing the value of current flow in tube 57. As the current flow through tube 57 increases, the potential drop produced across the cathode resistor 64 thereof is increased, which potential increase is applied to the field of the recorder driving motor to cause the inking pen thereof to record the change in the ambient magnetic field in a well known manner.

The potential applied to the field of the recorder motor increases as the meter indicating arm and condenser plate carried thereby continue to move in the direction of plate 68 in response to a continuous increase in intensity of the ambient magnetic field, maximum motor field potential being reached when plate 71 is positioned directly between plates 67 and 68. As the intensity of the ambient magnetic field decreases from this value, the meter indicating arm and plate carried thereby are caused to move toward the null position thereof, thereby causing an increase in capacity between plates 67 and 68 and in the negative charge appearing on the control grid of tube 57. When this occurs, the current flow through the tube is decreased as is the potential drop across resistor 64 whereby the pen of recorder 66 is caused to move toward the null position thereof; this action continuing as the magnetic field approaches its normal strength. It readily will be understood, from the foregoing description, that in the event that the intensity of the magnetic field decreases from the normal value thereof, the meter arm and condenser plate carried thereby are caused to move toward condenser plate 69 to increase the current flow through tube 58 and the potential drop across the cathode resistor 65 thereof thereby to cause the recorder pen and motor to operate in a direction opposite to that caused by the increase in intensity of the magnetic field.

Since a bridge circuit is employed in the recorder driver system, any changes in the surrounding atmosphere such, for example, as changes in humidity, will affect both tubes to the same extent and will be canceled out. In the event that greater linearity between the input to meter 73 and the current change in either tube is desired, adjustments on the A.-C. potential applied to stationary plate 67 and on the separation between the movable plate and plates 68 and 69 may be made. It will be understood, of course, that trigger action is to be avoided in this application of the blocking potential principle and, therefore, the separation between plates 68 and 69 and the stationary plate 67 is greater than that in the relay application.

From the foregoing, it should now be apparent that several embodiments of the invention have been provided which are well adapted to fulfill the aforesaid objects of the invention.

While the invention has been described with particularity in reference to examples thereof which give satisfactory results, it readily will be apparent to those skilled in the art, after understanding the invention, that further embodiments, modifications and changes may be made therein without departing from the spirit and scope thereof as defined by the claims appended hereto.

The present invention may be manufactured and used by or for the Government of the United States of America for governmental purposes without payment of any royalties thereon or therefor.

What is claimed as new and desired to be secured by Letters Patent of the United States is:

1. A recorder driver system of the character disclosed comprising, in combination, a pair of air condensers having a common fixed plate and a common movable plate, a source of A.-C. potential constructed and arranged to charge said condensers through said common fixed plate, means responsive to changes in a physical condition for moving said movable plate with respect to said common fixed plate variably in accordance with said changes thereby to vary the capacity of either one of said condensers selectively in accordance with deviations of the physical condition from a predetermined value thereof, and a vacuum tube bridge circuit having two electron discharge paths individual to said condensers and controlled by the capacity thereof, said bridge circuit also including a polarity sensitive recorder connected between said discharge paths as the detector arm of the bridge circuit and constructed and arranged to be operated in either direction selectively in accordance with the variations in the capacitance of the condenser being affected by said condition responsive means.

2. A recorder driver system of the character disclosed comprising, in combination, means responsive to changes in a physical condition, a galvanometer controlled by said condition responsive means and having an indicating arm deflectable in either direction from a null position upon changes in the condition, a pair of electron discharge devices arranged to form two arms of a balanced bridge circuit, each one of said discharge devices having a floating control element and a main discharge path the current in which is controlled by the voltage on the control element, a source of constant A-C potential, means including a pair of condensers of changeable capacitance so constructed and arranged as to be charged from said A.-C. source and respectively connected to the control elements of said discharge devices to supply voltages thereto which vary in value in accordance with changes in the capacity of the condensers respectively, a pair of impedance elements respectively arranged in the discharge paths of said discharge devices and forming the two remaining arms of said bridge circuit, polarity responsive recording means arranged as the detector arm of said bridge circuit and constructed and arranged to be operated selectively in either direction in accordance with the polarity of the voltage difference appearing across said impedance elements, and means constructed and arranged for coaction with said condensers and carried by said indicating arm for changing the capacitance of either one of said condensers selectively in accordance with an increase or decrease in said physical condition.

3. A trigger type electronic control system comprising, in combination, an electronic discharge device having floating control grid and cathode elements which are brought out of the discharge device in widely spaced relation to provide low surface leakage therebetween, said discharge device also having a main electron discharge path the current in which is controlled by the voltage on the control grid element, an air condenser of variable capacitance comprising a pair of wire-like plates secured in closely spaced parallel relation and a third wire-like plate movable into a position between said pair of plates in parallel relation therewith thereby to greatly change the capacitance of the condenser, one of said pair of plates being secured to said grid control element substantially at the point of emergence thereof from said discharge device, a galvanometer having an elongated indicating arm electrically connected to the cathode element, said movable plate being carried by said indicating arm and movable thereby into said position between said pair of plates from a position widely spaced therefrom when the galvanometer is operated by a current of predetermined strength, a source of constant A.-C. potential interconnected between said cathode element and the other one of said pair of plates for applying a voltage to the grid control element which biases the current in said discharge path closely to cut-off, and electroresponsive means connected in said discharge path and operable in response to the current flowing therein when said movable plate moves into said position between the pair of plates.

4. A stepless type electronic control system comprising, in combination, a pair of vacuum tubes each having floating control grid and cathode elements brought out of the tubes individual thereto in widely spaced relation to provide low surface leakage between the elements, each of said tubes also having a main electron discharge path the current in which is controlled by the potential on the control grid element individual thereto, a pair of wire-like substantially parallel condenser plates secured respectively to the control grid elements of said tubes substantially at the points of emergence thereof from the tubes, a third condenser plate secured midway between said pair of plates, a fourth condenser plate movable between said pair of plates substantially in parallel relation therewith thereby to vary the capacitance between said third plate and each of said pair of plates as the fourth plate moves therebetween, a pair of resistances connected in series between the cathode elements of said tubes and respectively within the discharge paths thereof for causing a difference in potential between the cathode elements which varies linearly with the changes in position of said fourth plate, a galvanometer having an elongated indicating arm electrically connected to the junction of said resistances, said fourth plate being carried by said indicating arm and movable variably thereby between said pair of plates in accordance with the changes in the magnitude and polarity of the galvanometer driving current, a source of constant A.-C. potential interconnected between said third plate and said indicating arm for applying a predetermined bias voltage to said control grid elements in accordance with the amplitude of the A.-C. potential, and electroresponsive means interconnected between said cathode elements and operable linearly with respect to said difference in potential therebetween thereby to provide a stepless response of the electroresponsive means which varies linearly with respect to the galvanometer driving current.

5. An electronic condition control system of the character disclosed comprising, in combination, a pair of electron discharge devices having floating control grid and cathode elements which are brought out of the device in widely spaced relation to provide low surface leakage therebetween, said discharge devices also having main discharge paths the current in which is controlled by the voltage on the control grid elements thereof, an air condenser formed of a pair of wire-like plates so constructed and arranged as to render the condenser variable in capacitance in response to changes in ambient conditions, said wire-like plates being respectively secured to said control grid elements substantially at the point of emergence thereof from the discharge devices, a fixed plate interposed intermediate said plates and disposed laterally of the plane thereof, a source of A.-C. potential interconnected between the cathode elements and the fixed plate for applying a bias voltage to said control grid elements in accordance with the amplitude of the A.-C. potential, a movable wire-like element constructed and arranged for movement between said wire-like plates in the plane thereof variably in accordance with changes in a preselected condition, means including said discharge devices which are similarly disposed for preventing response of the condenser to a humidity condition whereby the voltage on the control grid elements is varied in accordance with changes in the preselected condition and is not obscured by the humidity effect thereon, and electroresponsive means connected in said discharge path and operable variably in accordance with changes in the current therein thereby to make manifest said changes in the preselected condition.

EVERETT L. DEETER.

REFERENCES CITED

The following references are of record in the file of this patent:

UNITED STATES PATENTS

| Number | Name | Date |
|---|---|---|
| 1,112,549 | Pierce | Oct. 6, 1914 |
| 1,893,019 | Culver | Jan. 3, 1933 |
| 1,907,093 | Shivers | May 2, 1933 |
| 1,980,816 | McDill | Nov. 13, 1934 |
| 2,089,677 | Kramolin et al. | Aug. 10, 1937 |
| 2,117,894 | Lenehan | May 17, 1938 |
| 2,165,510 | Rosene | July 11, 1939 |
| 2,284,476 | MacKay | May 26, 1942 |
| 2,309,560 | Welty | Jan. 26, 1943 |
| 2,404,307 | Whitaker | July 16, 1946 |
| 2,416,780 | Tellier | Mar. 4, 1947 |
| 2,449,068 | Gunn | Sept. 14, 1948 |

FOREIGN PATENTS

| Number | Country | Date |
|---|---|---|
| 505,906 | Germany | Aug. 27, 1930 |

OTHER REFERENCES

Morecroft, Principles of Communications, John Wiley & Sons Inc. N. Y., 1921, pgs. 410–415.